United States Patent
Hoffmann et al.

[11] Patent Number: 6,133,714
[45] Date of Patent: Oct. 17, 2000

[54] METHOD OF DRIVING AT LEAST ONE CAPACITIVE ACTUATOR

[75] Inventors: Christian Hoffmann, Regensburg; Hellmut Freudenberg, Grossberg; Manfred Weigl, Viehhausen; Hartmut Gerken, Nittendorf; Martin Hecker, Laimerstadt; Richard Pirkl, Regensburg, all of Germany

[73] Assignee: Siemens Aktiengesellschaft, Munich, Germany

[21] Appl. No.: 09/455,604

[22] Filed: Dec. 6, 1999

Related U.S. Application Data

[63] Continuation of application No. PCT/DE98/01155, Apr. 24, 1998.

[30] Foreign Application Priority Data

Jun. 6, 1997 [DE] Germany .................. 197 23 932

[51] Int. Cl.[7] .................. H02J 7/16; H02N 7/00; H01L 1/04
[52] U.S. Cl. .................. 320/166; 318/116; 310/317
[58] Field of Search .................. 320/166; 318/116; 310/317, 315, 316, 341, 346; 123/490

[56] References Cited

U.S. PATENT DOCUMENTS

| | | |
|---|---|---|
| 4,688,536 | 8/1987 | Mitsuyasu et al. . |
| 5,387,834 | 2/1995 | Suzuki . |
| 5,543,679 | 8/1996 | Morina et al. . |
| 6,016,040 | 2/2000 | Hoffmann et al. ............ 318/116 |

FOREIGN PATENT DOCUMENTS

| | | |
|---|---|---|
| 0611881A1 | 8/1994 | European Pat. Off. . |
| 3621541A1 | 1/1987 | Germany . |
| 05029676 | 2/1993 | Japan . |
| 05344755 | 12/1993 | Japan . |

*Primary Examiner*—Adolf Deneke Berhane
*Assistant Examiner*—Gregory J. Toatley, Jr.
*Attorney, Agent, or Firm*—Herbert L. Lerner; Laurence A. Greenberg; Werner H. Stemer

[57] ABSTRACT

A method of driving at least one capacitive actuator with a charge voltage. From a charge quantity $\Delta Q$ supplied to the actuator and from the actuator voltage $U_p$ applied to the actuator after the charging operation is terminated, the actuator capacitance is calculated by the equation $C_p = \Delta Q / U_p$. From these values, the energy $E_{actual} = 0.5 * C_p * U_p^2 = 0.5 * \Delta Q * U_p$ is calculated. The charge voltage is regulated such that the energy actually supplied is equivalent to a specified desired value.

4 Claims, 1 Drawing Sheet

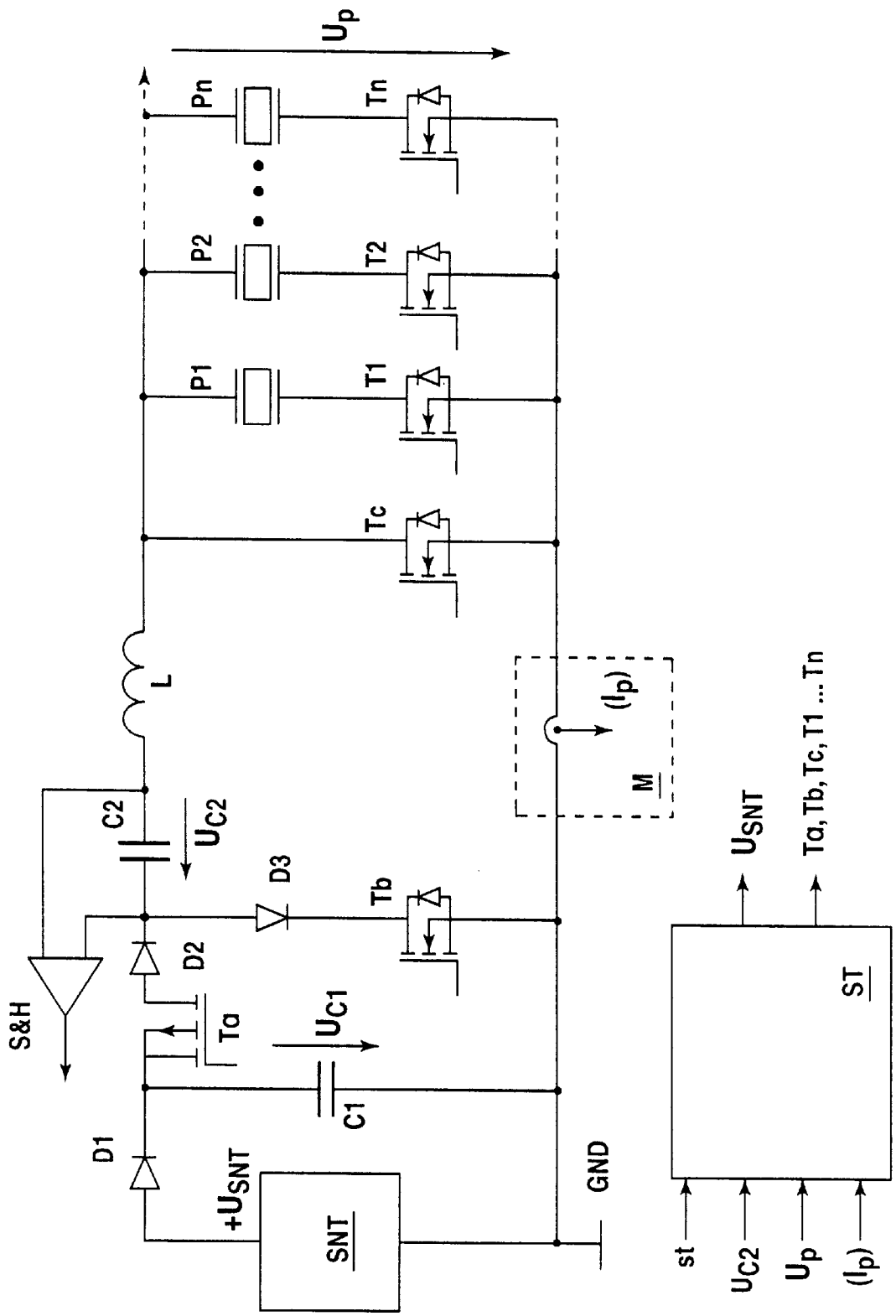

METHOD OF DRIVING AT LEAST ONE CAPACITIVE ACTUATOR

CROSS-REFERENCE TO RELATED APPLICATION

This is a continuation of copending International Application PCT/DE98/01155, filed Apr. 24, 1998, which designated the United States.

BACKGROUND OF THE INVENTION

Field of the Invention

The invention relates to a method of driving at least one capacitive actuator by means of a charge voltage.

A method of driving capacitive actuators is disclosed in U.S. Pat. No. 4,688,536, entitled "drive circuit for an electrostrictive actuator in a fuel injection valve. As suggested by the title, the patent relates in particular to a method of driving piezoelectrically operated fuel injection valves of an internal combustion engine. The actuators of the prior patent are charged with constant voltage.

A piezoelectric actuator comprises many piezoceramic layers and forms a so-called "stack", which when a voltage is applied changes its dimensions, and especially its length. In the reverse, the stack generates an electrical voltage in response to mechanical pressure or tensions.

The electrical properties of that kind of piezostack vary with the temperature to which it is exposed. As the temperature rises, its capacitance increases, but its stroke also lengthens. At the temperatures to be taken into account for automotive applications, ranging from about −40 C. to +150 C., changes in capacitance of up to a factor of 2 are observed.

If for instance a piezoelectric actuator is charged at all its operating points with a constant voltage, which at low temperatures brings about the required stroke, then at high temperatures the resultant stroke is markedly longer than necessary. In the context of fuel injection valves with a constant fuel pressure, of course, this means an excessive fuel injection quantity. Since at high temperatures the capacitance of the piezostack is also greater, much more charge and energy are needed than may be otherwise necessary.

Hence the method known from the afore-mentioned U.S. Pat. No. 4,688,536 does not work precisely enough unless the ambient conditions do not change at all (no tolerances in the components used, no changes in the electrical properties, constant temperature).

From U.S. Pat. No. 5,387,834 there is known a drive circuit for a capacitive actuator that is triggered with a constant charge voltage and with a charging time that is determined as a function of the actuator temperature. The temperature is measured with a sensor.

SUMMARY OF THE INVENTION

It is accordingly an object of the invention to provide a method of driving a capacitive actuator, which overcomes the above-mentioned disadvantages of the heretofore-known devices and methods of this general type and which operates to a sufficient degree of precision, without using a temperature sensor, even if the ambient conditions change.

With the foregoing and other objects in view there is provided, in accordance with the invention, a method of driving a capacitive actuator, which comprises:

charging a capacitive actuator with a charge voltage;

calculating, from a charge quantity $\Delta Q$ supplied to the actuator and from an actuator voltage $U_p$ applied to the actuator after the charging operation is terminated, an actuator capacitance by the equation $C_p = \Delta Q / U_p$;

calculating, from the actuator capacitance $C_p$ and the actuator voltage $U_p$, an energy $E_{actual}$ supplied to the actuator during the charging step by the equation $E_{actual} = 0.5 * C_p * U_p^2 = 0.5 * \Delta Q * U_p$;

comparing the energy $E_{actual}$ with a desired energy $E_{setpoint}$; and if the energy $E_{actual}$ is less than the desired energy $E_{setpoint}$, increasing the charge voltage $U_L = U_{C1} + U_{C2}$ by a predetermined amount for a next charging operation; or if the energy $E_{actual}$ is greater than the desired energy $E_{setpoint}$, increasing the charge voltage $U_L = U_{C1} + U_{C2}$ by the predetermined amount for the next charging operation.

In accordance with an added feature of the invention, the charge quantity $\Delta Q$ supplied to the actuator is determined by integrating the current $I_p$ flowing through the actuator during a charging operation according to the integration $\Delta Q = \int I_p dt$.

In accordance with an alternative embodiment of the invention, where the capacitive element is charged with a charging capacitor and a discharging capacitor that are connected in series, and a regulatable voltage is applied to the charging capacitor, the charge quantity $\Delta Q$ supplied to the actuator is determined by way of a difference $\Delta U = U_{before} - U_{after}$ in voltages $U_{before}$ and $U_{after}$ present at the discharging capacitor before and after the charging operation, respectively, and ascertaining a capacitance C2 of the discharging capacitor by the equation $\Delta Q = C2 * \Delta U = C2 * (U_{before} - U_{after})$ In accordance with a concomitant feature of the invention, the calculated actuator capacitance $C_p$ is used to determine an actuator temperature $T_p$.

Tests have shown that the energy supplied to a capacitive actuator is a much more precise measure for the stroke ds than the voltage supplied, and that charging at constant energy over the pertinent temperature range produces a substantially more constant stroke. At a constant temperature, the stroke varies approximately linearly with the voltage applied. If the temperature changes, then the stroke also changes, if the voltage is constant. Conversely, the stroke varies in proportion to the square of the applied energy, but independently of the temperature.

To that end, from the charge quantity $\Delta Q$ supplied to the actuator and from the voltage $U_p$ measured at the actuator (e.g. actuator P1), after the charging operation is terminated, the capacitance $C_p = \Delta Q / U_p$ of the actuator is calculated, and then from $\Delta Q$ and $C_p$, the energy $E_{actual} = 0.5 * C_p * U_p^2 = 0.5 * \Delta Q * U_p$ supplied to the actuator is ascertained. The value $E_{actual}$ is compared with a specified desired value $E_{setpoint}$, and depending on the outcome of the comparison, the charge voltage $U_L$ is re-regulated for the next triggering operation (that is, $U_L$ is increased if $E_{actual} < E_{setpoint}$, and $U_L$ is decreased if $E_{actual} > E_{setpoint}$.

In a method that can be used for arbitrary drive circuits, charge quantity $\Delta Q$ applied is ascertained by integrating the current $I_p$ flowing through the actuator. Then $$\Delta Q = \int I_p dt \rightarrow C_p = \int I_p dt / U_p \rightarrow E_{actual} = 0.5 * \int I_p dt * U_p$$

For circuits with a charging and discharging capacitor connected in series, as shown in the drawing, a simpler method for ascertaining the charge quantity $\Delta Q$ supplied to the actuator is disclosed according to the invention, in which no integration is necessary. In this method, the voltage present at the discharging capacitor C2 is measured both before the charging operation and then again after the charging operation is terminated, and the difference $\Delta U = U_{before} - U_{after}$ is formed and from that the charge quantity $\Delta Q = C2 * \Delta U = C2 * (U_{before} - U_{after})$ is calculated; with the voltage $U_p$ present at the actuator after the end of the charging operation, the actuator capacitance $C_p$ and the energy $E_{actual}$ supplied to the actuator are calculated analogously to the method described above:

$$\Delta Q = C2*(U_{before} - U_{after}) \to C_p = C2*(U_{before} - U_{after})/U_p \to E_{actual} = 0.5*C2(U_{before} - U_{after})*U_p$$

This value is compared, as already described above, with a specified desired value $E_{setpoint}$, and depending on the outcome of the comparison, the charge voltage $U_L$ is re-regulated for the next triggering operation.

Since the actuator capacitance $C_p$ is approximately proportional to the actuator temperature $T_p$, the calculated actuator capacitance $C_p$ can be used for determining the actuator temperature $T_p$ according to the formula $C_p = \Delta Q/U_p \approx T_p$. As a result, a temperature sensor can optionally be dispensed with.

Other features which are considered as characteristic for the invention are set forth in the appended claims.

Although the invention is illustrated and described herein as embodied in a method of driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE of the drawing is a circuit schematic of a drive circuit according to the invention for driving one or more actuators that actuate fuel injection valve(s).

DESCRIPTION OF THE PREFERRED EMBODIMENTS

Referring now to the FIGURE of the drawing in detail the method of the invention will be explained in terms of the illustrated circuit for driving at least one capacitive actuator (final control element) P1 to Pn for actuating at least one fuel injection valve by means of a control circuit ST. The control circuit ST is a part of a microprocessor-controlled engine control unit. The latter is not illustrated in any detail for reasons of clarity.

Between a positive pole $+U_{SNT}$ and a negative pole GND of a regulated voltage source SNT, preferably a switched mode power supply, a charging capacitor C1 is connected via a diode D1. A series circuit comprising a charging switch Ta, two further diodes D2 and D3, and a discharging switch Tb connected to the negative pole GND, is connected in parallel with the charging capacitor C1.

Between the node point of the two diodes D2 and D3 and the ground terminal GND, there is connected a series circuit comprising a charge reversal capacitor C2, a polarity reversing coil L, a first actuator P1, and a first, controlled selector switch T1.

For every further actuator P2–Pn, one series circuit comprising that actuator and a further selector switch T2–Tn is connected in parallel with the series circuit comprising the first actuator P1 and the first selector switch T1. In the exemplary embodiment, the selector switches, the discharge switches Tb and the bypass switches Tc, described below, are all N-type power MOSFET switches, which typically include inverse diodes. The charge switch Ta in this exemplary embodiment is embodied as a p-type power MOSFET switch.

A bypass switch Tc is also provided, as already mentioned; its drain terminal is connected to the node between the oscillating coil L and the actuators P1–Pn, and its source terminal is connected to the source terminal of at least the selector switch T1. All the switches are controlled via their gate terminals by the output signals of the control circuit ST.

The bypass switch Tc, connected in parallel with the actuators P1–Pn, is triggered by the control circuit ST, if the actuator voltage exceeds a predetermined limit value or if an error occurring in the engine as far as the power end stages of the injection valves is detected, and it discharges the capacitive actuators P1–Pn in short-circuited fashion via the inverse diodes of the selector switches T1–Tn. The bypass switch Tc is also needed for charging the discharging capacitor C2 before the first actuation of the actuator, or for recharging it between two chronologically widely spaced actuations of the actuator. Instead of the bypass switch Tc, a diode or Zener diode with the same polarity as the inverse diode of the bypass switch may be provided; in that case, however, the charging of the discharging capacitor C2 must be done via a actuator actuation for a fuel injection valve preferably without fuel pressure.

The switches T1, Tb, Tc and T1–Tn are controlled by the control circuit ST as a function of control signals st of an engine control unit. The engine control unit is not shown for purposes of clarity in the FIGURE. The charging capacitor C1 can be considered as an output capacitor of the switched mode power supply SNT.

The driving method for the circuit will now be described: During circuit operation, the charging capacitor C1 is charged to an output voltage $+U_{SNT}$ of the switched mode power supply SNT that is determined by the control circuit ST. The determining of this voltage $+U_{SNT}$ will be described later herein.

At the onset of operation, the charging capacitor C1 is charged to $+U_{SNT}$, and the discharging capacitor C2 is discharged; the polarity reversal coil L is without current. To charge the capacitor C2 as well before the first actuation of the actuator, the bypass switch Tc is first made conducting. As a result, C1 discharges via C2, L and Tc. Tc is then made nonconducting, and the discharge switch Tb is now made conducting. As a result, a current flows in the opposite direction through L, C2, Tb and the inverse diode of the bypass switch Tc, as a result of which C2 is charged and is polarized such that after one or more charging and discharging cycles, the charge voltage $U_L = U_{C1} + U_{C2}$ is present at the series circuit of C1 and C2.

The voltage $U_{C2}$ at the capacitor C2 is imparted to the control circuit ST via a measuring circuit, in this exemplary embodiment in the form of a sample-and-hold circuit S&H, and the control circuit sets the output voltage $+U_{SNT} \approx U_{C1}$ of the switched mode power supply SNT such that a specific initial voltage is present at the series circuit of C1 and C2.

Since the voltage $U_{C2}$ at the capacitor C2 slowly drops upon nonactuation, such recharging operations of the discharging capacitor C2 are also performed during operation, for instance during the charging operation at low rpm (that is, when actuator actuations are chronologically far apart), or in overrunning mode.

If a actuator actuation is to take place, then by the first method, the current $I_p$ flowing in the charging circuit is measured by means of a measuring circuit M, which in the simplest case can comprise a shunt resistor, and integrated in an integrator located in the control circuit. Since the measuring circuit M is needed only for this method, it is outlined by dashed lines in the drawing, and the reference symbol for the current $I_p$ is placed in parentheses. The rest of this method is performed as in the second method, described below.

In this second, simpler method, before the actuator is charged the voltage $U_{C2}=U_{before}$ is measured at the discharging capacitor C2 and is imparted to the control circuit ST. Next, the charge switch Ta and the selector switch T1, assigned to the corresponding actuator, such as P1, is made conducting. Current flows from SNT and C1 via Ta, C2, L, P1 and T1 to GND, until the actuator is charged. Then Ta and T1 are made nonconducting, and the actuator continues to be charged. Now the voltage $U_{C2}=U_{after}$ at the discharging capacitor C2 and the voltage $U_p$ at the actuator P1 are measured and imparted to the control circuit ST. Using the above-explained formulas, this circuit calculates the energy $E_{actual}$ supplied to the actuator and compares the value with a specified desired value $E_{setpoint}$. The requisite charge voltage $U_L$ for the next triggering operation is ascertained accordingly. If $E_{actual}<E_{setpoint}$, then the charge voltage $U_L$ is raised, for instance incrementally by one increment, compared to the value that was previously valid; if $E_{actual}>E_{setpoint}$, then it is decreased by one increment. The charge voltage $U_L$ is regulated to $E_{actual}=E_{setpoint}$.

The charge status of the actuator P1 is maintained until, after the control signal st vanishes, the discharge switch Tb is made conducting. With the discharge switch Tb conducting, all the actuators P1–Pn are discharged via the coil L to the discharging capacitor C2.

The voltage $U_{C2}$ present at the discharging capacitor C2 after the actuator has been discharged is imparted, via the sample-and-hold circuit S&H, to the control circuit ST, which re-controls the output voltage $+U_{SNT}$ of the switched mode power supply SNT such that the previously ascertained charge voltage $U_L=U_{C1}+U_{C2}$ is reached in the next triggering operation. With this charge voltage, the next charging operation of the actuator P1, of the charging operation of the next actuator P2, can be effected, and so forth.

We claim:

1. A method of driving a capacitive actuator, which comprises:

charging a capacitive actuator with a charge voltage;

calculating, from a charge quantity $\Delta Q$ supplied to the actuator and from an actuator voltage $U_p$ applied to the actuator after the charging operation is terminated, an actuator capacitance by the equation $C_p=\Delta Q/U_p$;

calculating, from the actuator capacitance $C_p$ and the actuator voltage $U_p$, an energy $E_{actual}$ supplied to the actuator during the charging step by the equation $E_{actual}=0.5*C_p*U_p^2=0.5*\Delta Q*U_p$;

comparing the energy $E_{actual}$ with a desired energy $E_{setpoint}$; and if the energy $E_{actual}$ is less than the desired energy $E_{setpoint}$, increasing the charge voltage $U_L$ by a predetermined amount for a next charging operation; or if the energy $E_{actual}$ is greater than the desired energy $E_{setpoint}$, decreasing the charge voltage $U_L$ by the predetermined amount for the next charging operation.

2. The method according to claim 1, which comprises determining the charge quantity $\Delta Q$ supplied to the actuator by integrating the current $I_p$ flowing through the actuator during a charging operation according to the integration $\Delta Q=\int I_p dt$.

3. The method according to claim 1, which comprises charging and discharging with a charging capacitor and a discharging capacitor connected in series, and applying a regulatable voltage to the charging capacitor, and determining the charge quantity $\Delta Q$ supplied to the actuator by way of a difference $\Delta U$ in voltages $U_{before}$ and $U_{after}$ present at the discharging capacitor before and after the charging operation, respectively, and ascertaining a capacitance C2 of the discharging capacitor by the equation $\Delta Q\ C2*\Delta U=C2*(U_{before}-U_{after})$.

4. The method according to claim 1, which comprises using the calculated actuator capacitance $C_p$ to determine an actuator temperature $T_p$.

* * * * *